(12) United States Patent
Di Luca

(10) Patent No.: US 8,333,821 B2
(45) Date of Patent: Dec. 18, 2012

(54) ENVIRONMENTALLY FRIENDLY SYSTEM AND METHOD FOR MANUFACTURING IRON POWDER

(75) Inventor: Carla D. Di Luca, Sewickley, PA (US)

(73) Assignee: InNova Powders, Inc., Lexington, MA (US)

( * ) Notice: Subject to any disclaimer, the term of this patent is extended or adjusted under 35 U.S.C. 154(b) by 381 days.

(21) Appl. No.: 12/795,960

(22) Filed: Jun. 8, 2010

(65) Prior Publication Data
US 2011/0300062 A1    Dec. 8, 2011

Related U.S. Application Data

(60) Provisional application No. 61/301,643, filed on Feb. 5, 2010.

(51) Int. Cl.
*B22F 9/20* (2006.01)
*C21B 11/06* (2006.01)

(52) U.S. Cl. .............. 75/359; 75/366; 75/444; 75/448

(58) Field of Classification Search ............ 75/366
See application file for complete search history.

(56) References Cited

U.S. PATENT DOCUMENTS

| | | | |
|---|---|---|---|
| 4,443,250 A * | 4/1984 | Meyer et al. | 75/444 |
| 5,660,805 A * | 8/1997 | Reeves et al. | 423/83 |
| 6,569,220 B1 | 5/2003 | Clark et al. | |
| 7,407,526 B2 | 8/2008 | Hu et al. | |
| 2007/0110648 A1 | 5/2007 | Nickels et al. | |

* cited by examiner

*Primary Examiner* — George Wyszomierski
(74) *Attorney, Agent, or Firm* — McKay & Associates, P.C.

(57) ABSTRACT

A low-temperature process of producing high-purity iron powder by feeding hematite and a reducing agent into a rotary reactor under pressure to form a mechanical fluid bed. The fluid bed is rotated at a particular speed within a rotary reactor. The fluid bed is simultaneously heated to a reaction temperature, and the pressure is then reduced within the rotary reactor to a pressure in a range of 0.01 bars to 2.0 bars, as a result reducing the reaction temperature to a temperature in a range of 600° C. to 850° C. Maintaining the pressure and the rotation results in the formation of a high-purity iron oxide without the requirement for post-grinding process steps because sintering is prevented by using a combination of pressure reduction and a rotary set at an optimum rotation speed, resulting in useful additives produced by a more environmentally-friendly process.

12 Claims, 4 Drawing Sheets

Operating Pressure: 0.010 bars
Temperature Range: 680-850 °C (vertical lines).
Suggested as optimum
Higher temperatures may lead to sintering of iron powder.

Production of Magnetite

Operating Pressure: 2 bars
Temperature Range: 600-690°C (Vertical Lines)
Suggested as optimum
Higher temperatures may lead to the production of
metallic iron powder

ENVIRONMENTALLY FRIENDLY SYSTEM AND METHOD FOR MANUFACTURING IRON POWDER

CROSS-REFERENCE TO RELATED APPLICATIONS

The instant application hereby claims benefit of provisional application Ser. No. 61/301,643 filed Feb. 5, 2010, the disclosure of which is incorporated by reference.

BACKGROUND

1. Field of the Invention

The present invention relates to a low-pressure system and method of producing iron powder and other oxidation forms of iron oxide powder using milled ferric iron oxide powder, or a blend of iron oxides powder. Because of the wide range of iron oxides produced by the instant method, the instant system and method provides the means for producing metallic iron at low pressure in powder form that can be used as an iron supplement for the food industry, or as a way to produce iron in powder form that can be used, for example, for the production of metal parts via powder metallurgy, as well as other applications.

2. Description of the Related Art

Starting from the higher degree of oxidation (hematite) it is possible to produce iron oxides with various degrees of oxidation for a variety of applications, such as magnetite for the production of black pigment or as a toner component. See for example U.S. Patent Pub. No. 20070110648.

A typical high purity hematite would be the iron oxide powder produced in the roasting of steel waste pickle liquor process. The specific surface area of the iron oxide produced by this method is between 500 and 1000 $m^2/kg$.

The properties of iron powder used for the production of components or for the food industry require a small particle size as well as strict requirements concerning residuals. The conventional method for obtaining this quality iron powder is by reduction of hematite in a belt furnace by using a multiplicity of gaseous reduction agents. Usually these processes are run at high temperature of about 1100° C.

The process known today typically consists of crushing and milling the raw material, laying a bed of the milled material in a belt furnace, and reducing the iron oxide to iron with a variety of reducing agents. However, the use of a high temperature sinters the particulates of the reduced iron, forming a cake. Therefore, the next required step is to milling the "cake" in an inert atmosphere to prevent re-oxidation, sieving, classifying and bagging the material. This multi-step approach is described by Clark (U.S. Pat. No. 6,569,220) and Hu (U.S. Pat. No. 7,407,526). Furthermore, both prior art processes use a belt conveyor (fix bed) furnace that require high reducing temperatures and milling after processing because the iron product comes out of the reduction furnace sintered. Before its use the product needs to be milled in an inert atmosphere to prevent re-oxidation of the iron powder. The specific surface area of the product obtained is between 300 and 450 $m^2/kg$. This parameter is important because it defines the reactivity of the product when used as an iron supplement for the food industry.

As known then, in order to produce a high-purity iron powder with desirable characteristics the high temperature and thermodynamics of the process control the rate of the reaction, e.g. the nature of the reactants, the product of the reaction (solids, gases), and the change in the number of mols of the reaction which will produce a change in the rate of the reaction itself. There is a need, then, for a more efficient and flexible method for obtaining iron powder which accounts for pressure as the state variable for defining the system in a way that can be used for the production of specialty products at a lower cost, reducing the use of energy and the process steps required to deliver the final product. These advantages of the instant method results in an environmentally friendly process and, in addition, produce a higher quality product, as follows.

SUMMARY OF THE INVENTION

It is the objective of the present invention to produce metallic iron powder, magnetite or other iron oxides using as a raw material natural or synthetic hematite.

It is a further objective of the present invention to reduce the processing cost of obtaining iron powder, magnetite or other iron oxides by using a low temperature process and a variety of reducing agents singularly or in combination, such as coal, ammonia, hydrogen, and natural gas.

It is a further objective of the present invention to reduce the ferric oxide, or other iron oxides, in a single stage step, by heating the powder at a suitable temperature estimated between 600 and 850 Degrees Centigrade under vacuum, in a mechanical fluid bed that will prevent sintering or agglomeration of the powder, eliminating the need for milling in an inert atmosphere as required by existing inventions.

It is a further objective of the present invention to prevent agglomeration of the powder by rotating the mechanical fluid bed at high rotating speed that combined with internal mixing fins optimizes the fluidization of the load and prevents sintering, as well as improves the contact between the reducing gases and the powder. Therefore the size and number of particles throughout the process remain approximately the same within the desired the range to eliminate unusable waste particles and the need for post-grinding.

It is a further objective of the present invention to operate the mechanical fluid bed at various degrees of vacuum and/or pressure to control the degree of reaction of the iron oxides as well as reduce the reaction temperature to below 780° C. eliminating the possibility of sintering or agglomeration of the powder.

It is a further objective of the present invention to inject ammonia as part of the process gas to generate nitrogen and hydrogen which will be used to produce an inert or slightly reducing atmosphere to prevent a change in the oxidation state of the same during the cooling stage of the product.

It is a further objective of the present invention to prevent re-oxidation of the reduced powder by cooling the same under an inert or slightly reducing gas blanket generated by the process gas by-products.

It is a further objective of the present invention to reduce the use of energy in the production of these products by reducing the reaction temperature and eliminating milling of the product, leading to an environmentally friendly method when compared to existing processes.

Accordingly, the instant invention comprehends a process of producing high-purity iron powder by feeding hematite and a reducing agent into a rotary reactor to form a mechanical fluid bed. The fluid bed is rotated with a rotation speed in the range of 6 to 100 rpm. The fluid bed is then heated to a reaction temperature of up to 1100° C. Critically, the pressure is then reduced within the rotary reactor to a pressure in a range of preferably 0.01 bars to 2.0 bars (optionally up to 50 bar), as a result reducing the reaction temperature to a temperature in a range of 600° C. to 850° C. Finally, the pressure and the rotation are maintained, wherein a high-purity iron oxide is formed without the requirement for post-grinding process steps, such post-grinding steps increasing production costs and increasing the amount of unusable particles and waste. The products resulting from specific settings of the process include a high-purity iron oxide powder capable of being used as an iron supplement for food and also a high-purity magnetite capable of being used an additive for toner or black pigment, both of which are formed without the requirement for post-grinding process steps.

DETAILED DESCRIPTION OF THE PREFERRED EMBODIMENT

Figure 1:
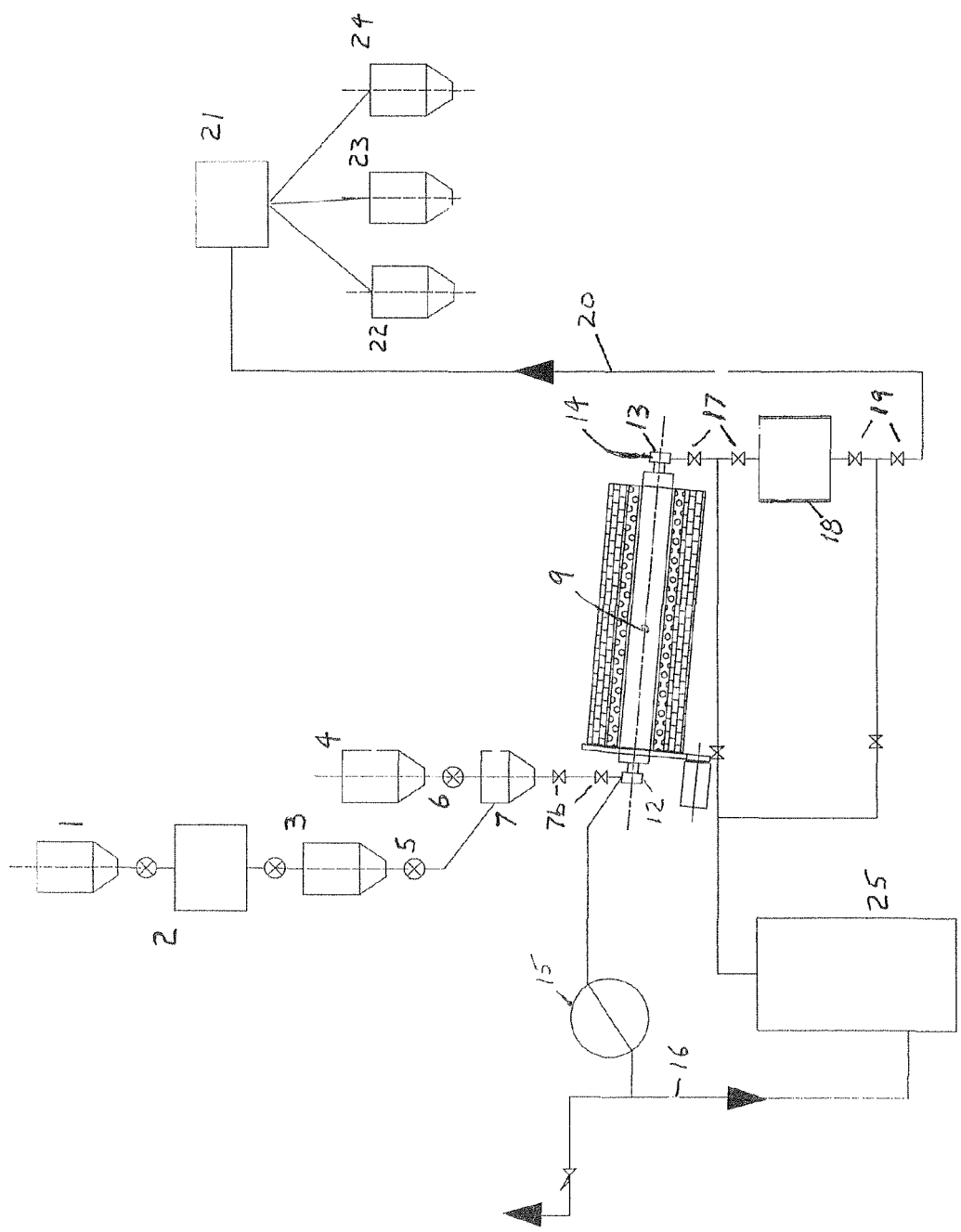
FIG. 1 is a diagram showing the overall process.
Figure 2:
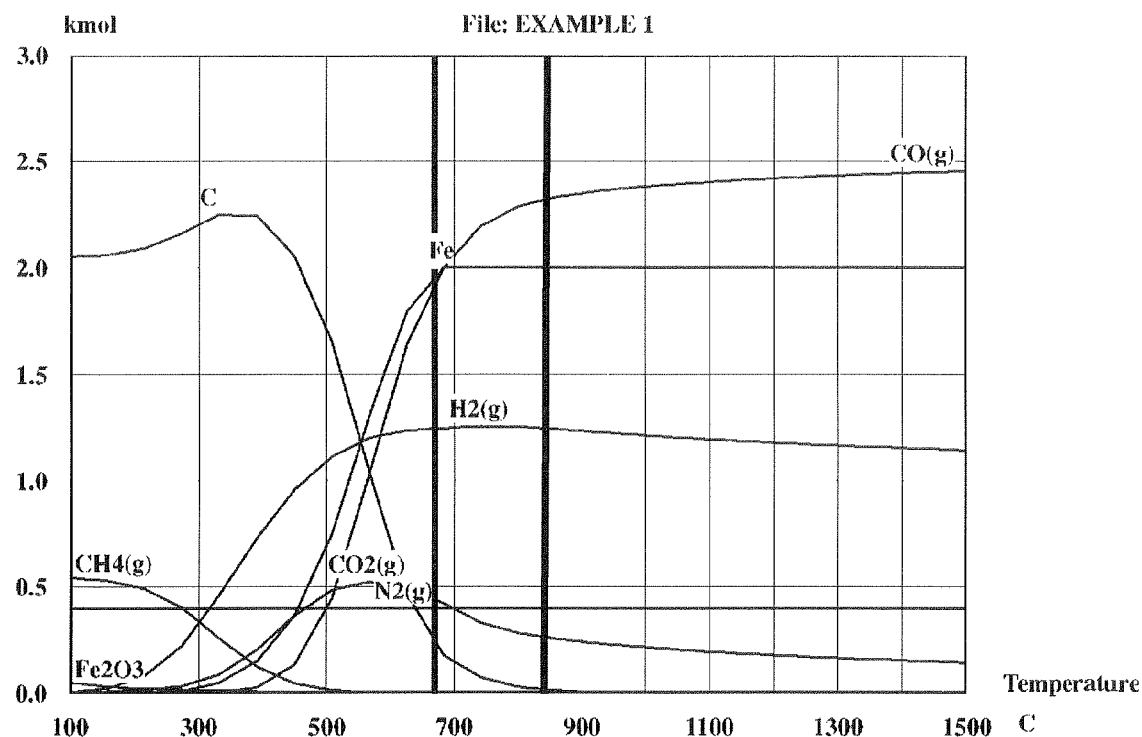
FIG. 2 is a reaction graph for the production of iron powder at a particular temperature with pressure applied.
Figure 3:
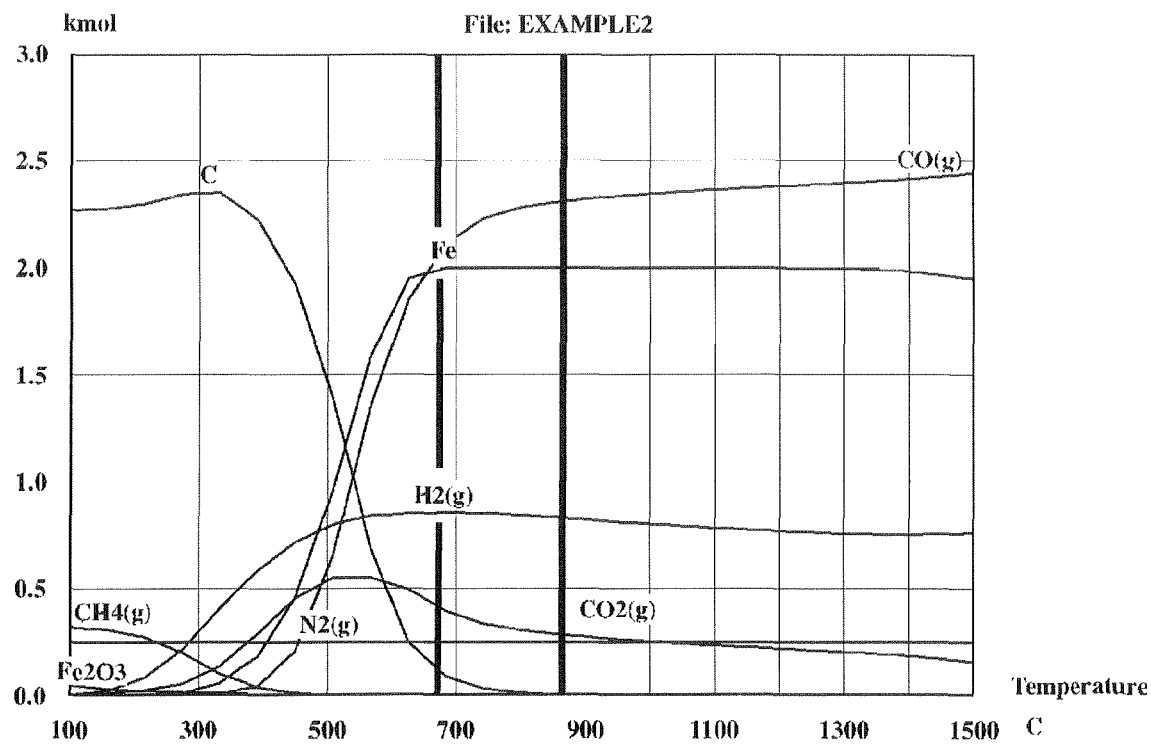
FIG. 3 is a reaction graph for the production of the same iron powder but with a different amount of reactants.
Figure 4:
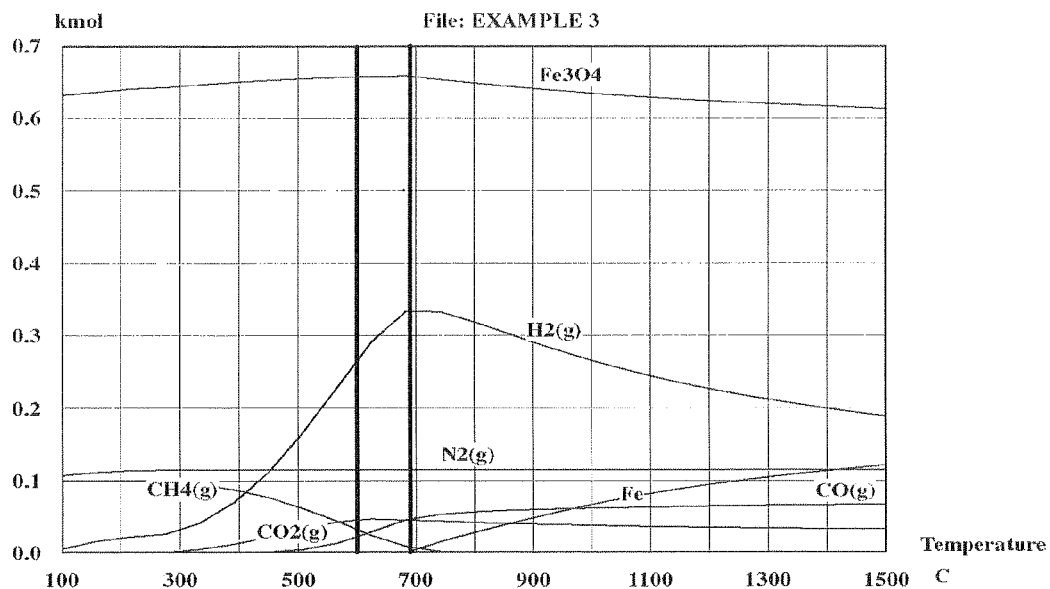
FIG. 4 is a reaction graph for the production of magnetite at a particular temperature with pressure applied.

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications and applications as would normally occur to persons skilled in the art to which the invention relates. This detailed description of this invention is not meant to limit the invention, but is meant to provide a detailed disclosure of the best mode of practicing the invention.

For the instant system and method, the raw material used for manufacturing metallic iron powder, magnetite or oxides is iron oxide powder, or hematite. The iron oxide powder can be natural or synthetic hematite. This ferric oxide material is typically obtained as fines in the production of iron ore or produced by roasting waste pickle liquor from steel pickling lines. The purity of the final product will depend on the purity of the raw material used for its production.

Even though this process and apparatus can be used for a variety of final products, focused herein as an example is the production of fine high purity iron powder with a particle size between 1 and 5 µm, which lends itself to particular food and industrial applications. Such food applications including iron supplements and such industrial applications including metal injection molding.

Accordingly, hematite is produced by roasting steel waste pickle liquor. The oxide typically consists of individual particles of about 1 µm in diameter and agglomerates up to 100 µm in diameter. It may be necessary to mill the material to pass 99.9% through 325 mesh sieve. After jet milling, for instance, 95% of the oxide particles will be below 5 µm in diameter.

In the preferred embodiment of the instant system and method the raw material then is a higher purity ferric oxide, commonly referred to as hematite. This is typically stored in a storage silo 1. From this silo 1, the hematite is discharged to a grinding mill, which preferably is a jet mill 2 operating with air or a similar device. As a result the agglomerates typical of this raw material are reduced or eliminated.

After milling, the ferric oxide powder is stored in the receiving bin 3, while a reducing agent such as coal powder is stored in the coal silo 4. The reducing agent can be coal, hydrogen, natural gas, ammonia, carbon powder, or any combination thereof. The reducing agent will reduce the hematite when combined therewith in the form of a mechanical fluid bed 9.

Thus, the hematite from the receiving bin 3 and the coal (or reducing agent) from the coal silo 4 are fed to a rotary reactor, namely the reactor feed chute 7, by way of rotary feeders 5 and 6 in the ratio required by the process (at the rate defined by the production capacity of the unit) to form a mechanical fluid bed 9. The components are fed directly into the rotary reactor through the feed chute 7 and the block and bleed system 7b. Critical is that a rotary reactor be used which includes rotating, internal fins. It has been determined through significant experimentation that the rotary reactor's internal fins set at a rotation speed between 6 and 100 rpm will produce the appropriate fluidization of the mechanical fluid be 9.

The mechanical fluid bed 9 within reactor is heated to the reaction temperature by an external means such as an electric heater, natural gas burners or similar device. The reaction temperature could reach up to 1100° C. However, an internal pressure is applied to the mechanical fluid bed 9 by implementing a vacuum pump 15. Thus, subsequently to the reaction temperature being reached or simultaneously during the temperature rise, the pressure within the rotary reactor is reduced to a pressure in the range of 0.01 bars to 2.0 bars (depending on the application), which reduces the reaction temperature within the mechanical fluid bed 9 to a temperature in the range of 600° C. to 850° C. For example the reduction of the pressure to about 0.35 bar increases the kinetics of the reaction and reduces the reaction temperatures from 1100° C. to between 720° C. and 740° C. The above mentioned factor of applying pressure is critical to allow a substantially complete reaction of the powder at such a low temperature, and critically, an identical product can be produced at the same or similar low temperature even by varying the amount of reactants as long as the operating pressure is changed. It should be understand that the pressure range of 0.01 to 2.0 bars is the preferred minimum pressure range and the pressure can be increased, for example up to 50 bars, the critical point being that at least some pressure must be applied to make the product at a lower temperature, again depending also on the reactants.

A process gas such ammonia, ammonia doped with oxygen, hydrogen, or natural gas, may be injected in some applications through the rotary joint 13, and released through the discharge of the vacuum pump 15 to the off-gas system 16. The reacted gases will be mainly $N_2$, $CO_2$, $H_2$, and traces of CO and $H_2O$. The off-gas is processed through the trap bed 25 that operates with a caustic reactant which retains the $CO_2$ and $H_2O$, leaving in the stream only $N_2$, a small amount of $H_2$, and traces of CO. If required the off gas can also be processed through a thermal oxidizer (not shown) before passing the same through the trap bed 25. This gas is used to provide a blanket of the iron or the oxide powder that is cooling down in the cooling chamber 18. The gas blanket resides or can be separately injected into the mechanical fluid bed 9 to prevent re-oxidation of the high-purity iron oxide powder.

As indicated above, the material is fed continuously to the mechanical fluid bed 9 through the rotary joint 12 and it is discharged from the mechanical fluid bed 9 through rotary joint 13 and dropped into the cooling chamber 18 through a block and bleed system 17. Once the iron oxide reaches a temperature below 60° C., it is dropped from the cooling chamber 18 through a block and bleed system 19 to a conveying system 20 and subsequently delivered to a classifier 21, which will sort the material (according to particle size) in three or more bins, for example according to the arrangement shown in FIG. 1.

As above, the low process temperature that results from the vacuum applied to the mechanical fluid bed 9 combined with the fluidization of the powder using a fin-implemented reactor with optimized rotation speed prevents re-agglomeration of the powder and eliminates the need for post-grinding of the material, i.e. post-production steps inherently required by previous, high-temperature processes. Depending on the desired characteristics, as exemplified below, what results is a high-purity iron powder having a particle size in the range of 0.5 to 40 μm, and wherein the iron powder has a purity of up to 99.7%. Furthermore, as a result of the elimination of the post-grinding step, each particle that has reacted with the reactants individually during the process will maintain this individuality, i.e. it will not agglomerate or sinterize. Therefore the size and number of particles throughout the process remain approximately the same within the desired the range to eliminate unusable waste particles. Critical then is that the instant process reduces the high-purity iron powder while simultaneously maintaining particle size distribution even as the individual chemistry of each particle is changing.

EXAMPLE 1

As an example, described is the production of iron powder which can be used as an iron supplement or high-end food application using ferric oxide powder as a raw material.

Ferric oxide ($Fe_2O_3$) produced by roasting steel waste pickle liquor is milled in a jet mill 2 or equivalent process to reduce or eliminate any agglomerate of the same, producing a particle size distribution in which 95% of the material is under 5 μm.

The material is loaded in the mechanical fluid bed in the following proportion, 190 kg of coal in powder form for every 1000 kg of $Fe_2O_3$.

The mechanical fluid bed 9 reaction zone is set at a temperature optimally in the range of 720° C.-740° C. (optionally 680° C.-850° C.) and the pressure is set at 0.025 bar. Milled ferric oxide is fed through the reactor feed chute, while ammonia is flown through the rotary joint 13 at a rate of 114 $Nm^3$ and CH4 at a rate of 14 Nm3 per 1000 kg of oxide, purging the system and producing the necessary amount of $N_2$ and $H_2$.

To prevent agglomeration in the interior of the mechanical fluid bed 9 the rotation speed of the same is set at about 30 rpm (15-45 rpm but optimally 30 rpm), thereby creating a fluid bed within the rotary reactor.

The residence time of the ferric oxide is preferably set to thirty (30) minutes or about thirty (30) minutes (between 30 and 45 minutes) by controlling the feed rate.

Process gas in the form of ammonia doped with oxygen is injected through the process gas 14 at a rate defined by the feed rate of the ferric oxide. The process gas will crack inside the rotary reactor and will, along with the coal particles, react with the ferric oxide powder ($Fe_2O_3$) forming $CO_{(gas)}$. The $H_{2(gas)}$ of the cracked ammonia along with the CO formed would further reduce the ferric oxide to iron powder in solid state, while maintaining the original morphology.

The iron powder formed will then pass through the block and bleed system 17 and the cooling chamber 18 in which is injected a blend of nitrogen and hydrogen, or solely nitrogen, as a blanket to prevent re-oxidation of the iron powder. The blanket is maintained until the temperature of the iron powder reaches 60 Degrees Centigrade. At this temperature, or lower, the iron powder is removed through the block and bleed system 19.

The iron powder produced by this method can then be used as an iron supplement for food, as well as other high end applications that require high purity and small particle size such as metal injection molding.

If required the iron powder is processed through a classifier 21 and sorted to the proper bins 22, 23, 24 for bagging and shipping.

EXAMPLE 2

In this example described similarly is the production of iron powder using ferric oxide powder ($Fe_2O_3$) produced by roasting steel waste pickle liquor. The ferric oxide powder is milled in a jet mill 2 or equivalent process to reduce or eliminate any agglomerate of the same, producing a particle size distribution in which 95% of the material is under 5 μm. Here, the reduction is performed under vacuum with natural gas, ammonia and carbon powder as reducing agents.

Different from the previous example is that herein the reactant amounts are varied. Namely, the material is loaded in the mechanical fluid bed 9 in the following proportion, 1000 kg of $Fe_2O_3$ and 187 kg of coal powder.

The mechanical fluid bed 9 reaction zone is set at an optimum temperature in the range of 720° C.-740° C. (optionally 680° C.-850° C.) and a pressure (vacuum) of 100 mm of water column (mmWC). Notably, the temperature range is the same as in the above example but the pressure is lowered.

Milled ferric oxide is fed through the reactor feed chute 7, while ammonia is flown through the rotary joint 13 at a rate of 70 $Nm^3$ per 1000 kg of oxide, and natural gas is flown through at a rate of 14 $Nm^3$ per 1000 kg of iron oxide.

To prevent agglomeration in the interior of the mechanical fluid bed 9, the rotation speed of the same is set at about 30 rpm (15-45 rpm but optimally 30 rpm), creating a fluid bed.

The residence time of the ferric oxide is set to about thirty (30) minutes by controlling the feed rate.

Process gas injected through the process gas connection is ammonia and natural gas, injected at a rate defined by the feed rate of the ferric oxide. The process gases will crack inside the rotary reactor 10 and will, along with the coal particles, react with the ferric oxide powder ($Fe_2O_3$) forming $CO_{(gas)}$. With the $H_{2(gas)}$ of the cracked ammonia along with the CO formed, this further reduces the ferric oxide to iron powder in solid state, while maintaining the original morphology.

The iron powder formed will pass through the block and bleed system 17 and the cooling chamber 18 in which is injected a blend of nitrogen and hydrogen, or solely nitrogen, as a blanket to prevent re-oxidation of the iron powder. The blanket is maintained until the temperature of the iron powder reaches 60 Degrees Centigrade. At this temperature, or lower to about room temperature, the iron powder is removed through the block and bleed system 19.

The iron powder produced by this method can then be used as an iron supplement for food, as well as other high end applications that require high purity and small particle size such as metal injection molding.

If required the iron powder is processed through a classifier 21 and sorted to the proper bins 22, 23, 24 for bagging and shipping.

EXAMPLE 3

Described by this example is the production of magnetite powder ($Fe_3O_4$) using ferric oxide powder ($Fe_2O_3$) produced by roasting steel waste pickle liquor, which it is milled in a jet mill or equivalent process to reduce or eliminate any agglomerate of the same producing a particle size distribution in which 95% of the material would be under 5 μm. Here, the reduction is performed under pressure with natural gas and ammonia as reducing agents.

A mechanical fluid bed 9 reaction zone is set at an optimum temperature in the range of 630° C.-650° C. (optionally 600° C.-690° C.) and a pressure of up to 2 bars. 1000 kg of milled Ferric Oxide is loaded in the mechanical fluid bed 9.

The milled ferric oxide is then fed through the reactor feed chute 7, while ammonia is flown through the rotary joint 13 at a, rate of 33 Nm$^3$ per 1000 kg of oxide, and natural gas at a rate of 14 Nm$^3$ per 1000 kg of iron oxide.

To prevent agglomeration in the interior of the mechanical fluid bed 9 the rotation speed of the same is set at about 30 rpm (15-45 rpm but optimally 30 rpm), creating a fluid bed.

The residence time of the ferric oxide is set to about forty-five (45) minutes by controlling the feed rate.

Process gas in the form of ammonia and natural gas is injected through the process gas 14 connection at a rate defined by the feed rate of the ferric oxide. The process gases will crack inside the rotary reactor 10 and will react with the ferric oxide powder ($Fe_2O_3$) forming $CO_{(gas)}$. The $H_{2(gas)}$ of the cracked ammonia along with the CO formed would further reduce the ferric oxide to magnetite ($Fe_3O_4$) in solid state, while maintaining the original morphology.

The iron powder formed will pass through the block and bleed system 17 and the cooling chamber 18 in which is injected a blend of nitrogen and hydrogen, or solely nitrogen, as a blanket to prevent re-oxidation of the magnetite powder. The blanket is maintained until the temperature of the Magnetite reaches 60 Degrees Centigrade. At this temperature, or lower, the magnetite powder is removed through the block and bleed system 19.

The magnetite powder produced by this method can then be used as additive for toner or black pigment, as well as other high end applications that would require high purity and small particle size.

If required the magnetite powder is processed through a classifier 21 and sorted to the proper bins for bagging and shipping.

I claim:

1. A process of producing high-purity iron powder, comprising the steps of:

feeding hematite and a reducing agent into a rotary reactor to form a mechanical fluid bed;

rotating said mechanical fluid bed with a rotation speed in the range of 6 to 100 rpm;

heating said mechanical fluid bed to a reaction temperature of up to 1100° C.;

reducing pressure within said rotary reactor to a pressure in a range of 0.01 bars to 2.0 bars, as a result reducing said reaction temperature to a temperature in a range of 600° C. to 850° C.; and, maintaining said pressure and said rotation to form said high-purity iron powder.

2. The process of claim 1, wherein prior to the step of feeding, said hematite is discharged to a grinding mill such that said hematite is milled to reduce agglomerates.

3. The process of claim 1, wherein said reducing agent is selected from the group consisting of coal, hydrogen, natural gas, ammonia, and carbon powder.

4. The process of claim 1, further comprising the step of cooling said high-purity iron powder to below 60° C.

5. The process of claim 1, wherein each said particle of said high-purity iron powder has a particle size in a range of 0.5 μm to 40 μm.

6. The process of claim 5, wherein 95% of said high-purity iron powder has a particle size of under 5 μm.

7. The process of claim 1, wherein said high-purity iron powder has a purity of up to 99.7%.

8. The process of claim 1, further comprising the step of injecting a process gas into said mechanical fluid bed to form an off-gas.

9. The process of claim 8, further comprising the step of processing said off-gas through a thermal oxidizer.

10. The process of claim 8, wherein said process gas is selected from the group consisting of ammonia, hydrogen, and natural gas.

11. The process of claim 8, further comprising the step of treating said off-gas to retain $CO_2$ and $H_2O$, leaving in a stream only $N_2$, a small amount of $H_2$, and traces of CO, as a result producing an inert gas blanket.

12. The process of claim 11, further comprising the step of injecting said inert gas blanket into said mechanical fluid bed to prevent re-oxidation of said high-purity iron powder.

\* \* \* \* \*